United States Patent [19]

Alford

[11] 3,866,228

[45] Feb. 11, 1975

[54] TWO FREQUENCY LOCALIZER GUIDANCE SYSTEM

[76] Inventor: Andrew Alford, 71 Bacon St., Winchester, Mass. 01840

[22] Filed: Mar. 23, 1973

[21] Appl. No.: 344,358

[52] U.S. Cl.............. 343/109, 343/107, 343/108 R
[51] Int. Cl.............................................. G01s 1/14
[58] Field of Search................. 343/107, 108 R, 109

[56] References Cited
UNITED STATES PATENTS
3,711,857    1/1973    Cummings.......................... 343/109

Primary Examiner—Maynard R. Wilbur
Assistant Examiner—Richard E. Berger
Attorney, Agent, or Firm—Robert T. Dunn

[57] ABSTRACT

A localizer signalling system for guiding a craft along a course defined by double lobe course and clearance radiation patterns of different frequencies has a single array of radiating elements all energized by a "Course" group of frequencies and some or all elements energized by a "Clearance" group of frequencies through directional couplers, the coupling factor of the directional couplers determining the ratio of course frequency power to clearance frequency power energizing the array.

13 Claims, 14 Drawing Figures

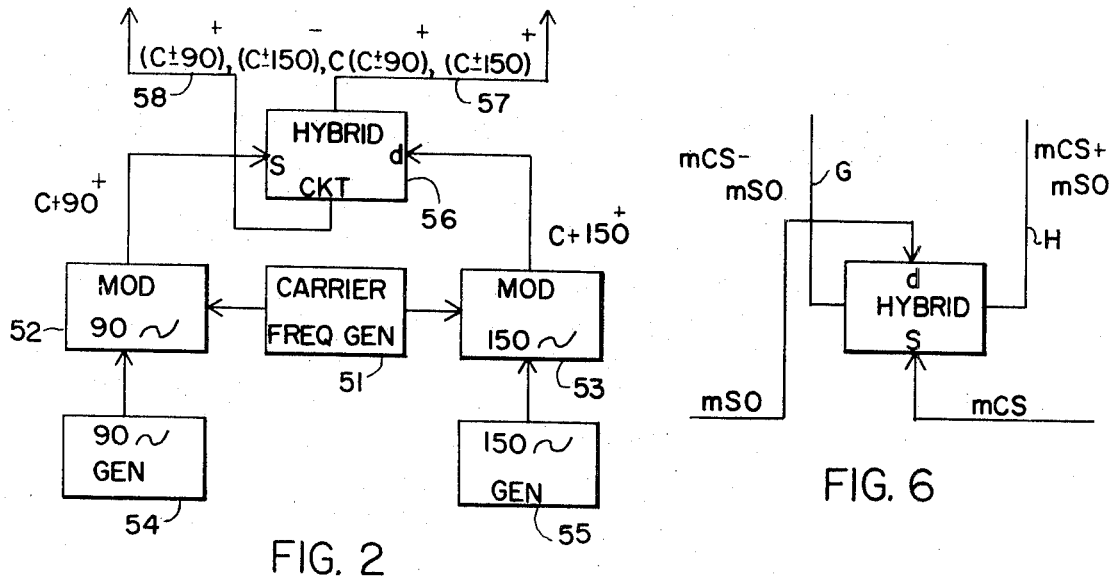
FIG. 2
FIG. 6
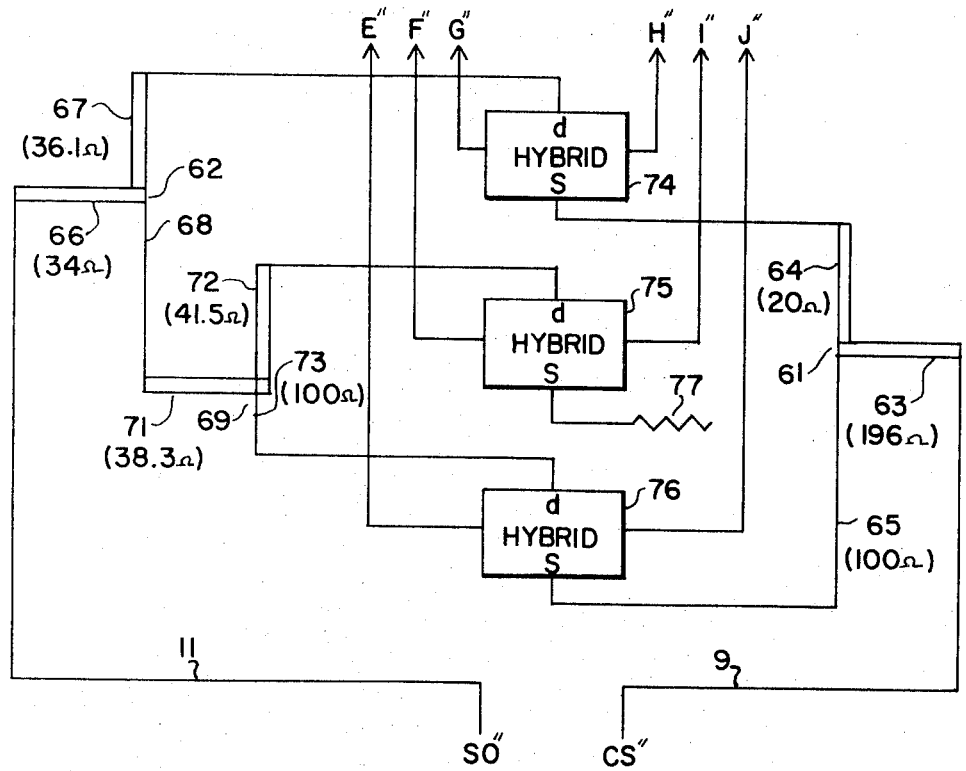
FROM CLEARANCE POWER TRANSMITTER
FIG. 3

TWO FREQUENCY LOCALIZER GUIDANCE SYSTEM

The present invention relates to two frequency localizer signalling systems for guiding an aircraft along a prescribed course of the type described in U.S. Pat. No. 2,682,050.

A localizer guidance system basically provides partially overlapping symmetrical radiation patterns, usually referred to as right and left lobe sideband patterns. The carrier frequency in the two major lobes is modulated predominantly at two different audio frequencies which are 90 Hz and 150 Hz. Along the line of symmetry defined by the equality of these two modulations is the course line aligned with the centerline of a runway. This equality of the 90 Hz and 150 Hz sideband along the course line is indicated by a null on the cross pointer instrument in the cockpit.

On one side of the course line, 90 Hz modulation is predominant; on the other side of the course, the 150 Hz modulation is predominant. According to Annex 10 to Standards ICAO (international Civil Aviation Organization) Standards, a localizer is required to give left and right course indications with the ±35° sector bisected by the course.

At large airports, it is often necessary that the left and right major sideband lobes be very narrow, about 5° or 7° wide to minimize reflections from large hangars and other large structures located in the vicinity of the runway. Furthermore, the course is more precisely defined by narrow intersecting sideband lobes. On the other hand, it would be possible that an approaching aircraft for this reason miss the narrow lobes and be confused by the minor lobes. Such narrow lobes would satisfy the ICAO Standard.

In an effort to gain all the benefits of the narrow directional overlapping sideband lobes in a localizer guidance system and still provide a reliable indication when the craft is considerably off the course line, the two frequency localizer guidance system was developed. Such a two frequency localizer guidance system is described in my U.S. Pat. No. 2,682,050 entitled "Localizer Antenna System" which issued June 22, 1954. The system described in that patent provides two narrow overlapping course sideband lobes radiated by one antenna energized by power from a course frequency transmitter and also two broad overlapping clearance lobes radiated by another antenna energized by power from a clearance frequency transmitter. The narrow pair of lobes and the broad pair of lobes, each define the same desired course line aligned with a runway. The carrier frequency of the left and right narrow lobes, called course frequency, is modulated by different audio frequencies, i.e., 90 Hz and 150 Hz. The carrier frequency supplied to the clearance array differs from the course array carrier frequency by about 8 KHz. This carrier frequency is also modulated by 90 Hz and 150 Hz in the same way and in the same audio phase as the course array carrier. The 8 KHz separation in frequency groups is small in comparison with the bandwidth of the receiver. Therefore, both frequency groups can be received simultaneously without returning the receiver. The advantage of this system is that an aircraft approaching the desired course line can receive useful information over a wide sector. At the same time, near the course line, the guidance is provided by narrow intersecting beams which do not illuminate nearby hangars. While clearance array frequencies may be reflected from hangars, the reflected clearance signals are at frequencies different from the frequencies of the predominant signal along the course so that a stationary interference pattern that would be observed as "course bends" is not formed. An interference pattern along the course may be formed at the clearance frequencies, but the response to this pattern is substantially suppressed by the capture effect as long as the ratio of the on course signal from the clearance array to the on course signal from the course array is less than about 0.4.

A suitable ratio of powers fed to the course and clearance arrays is greater than 2. That is, the power to the course antenna array is preferably two to sometimes 10 times as great as the power fed to the clearance array. Furthermore, it has been required that two separate antenna arrays be provided, a course array and a clearance array each producing overlapping sideband lobe patterns that define the same course line aligned with the runway. Two sites for these antennas must be provided at the end of the runway located so that neither antenna array distorts the radiation pattern from the other by shadowing or by reflecting.

Because the two arrays cannot be placed closer than about 75 feet from each other and are preferably separated by 150 feet, there will be situations where there is not sufficient space between the end of a runway and the airport boundary for both arrays since each of them must satisfy the rule. The height of an array should not exceed $(X-200)/50$ feet where $X$ is the distance between the array and the end of the runway. Thus, for example, antennas 6 feet high may be installed at distances no less than 500 feet from the runway.

SUMMARY OF THE INVENTION

In the present invention, a multiple element directional antenna is provided and energized by both course and clearance frequencies, both within the localizer frequency band of typical aircraft localizer receivers. All the elements of the antenna array are energized by course frequency, $C'$, and selected elements are energized by clearance frequency, $C''$, the course frequency input power to the antenna array being substantially greater than the clearance input power to the array, whereby the relatively narrow left and right course sideband lobes produce the principal localizer course aligned with a runway and the broader left and right clearance sideband lobes provide guidance over wide sectors to the left and to the right of the runway as seen from the localizer. Since all the course and clearance radiation patterns are launched by the same antenna, only one antenna site is needed and the problems in prior systems which arise due to shadowing or due to reflecting of the signal radiated by one antenna in the direction of the other are avoided.

In the left and right course and the left and right clearance frequency radiation patterns there is carrier frequency and four sideband frequencies. For example, where the left and right audio modulations are 90 Hz and 150 Hz, the course frequency patterns include: $C'$, $C'+90$ $C'-90$, $C'+150$ and $C'-150$.

In a preferred embodiment of the present invention, all the elements in the single antenna array are energized by the course frequency and selected elements are energized by the clearance frequency. Each of the selected elements of the antenna array are energized through a device that is fed course frequency power from one line and clearance frequency power from another line and combines these powers unequally and feeds the combined powers to one of the selected elements. One very suitable device for doing this is a four port directional coupler. One of the input ports to the directional coupler is fed course frequency power and the other is fed clearance frequency power at substantially the same level. The coupling factor of the directional coupler is such that the resulting course and clearance beams from the antenna are in the desired unequal power ratio with the course array being supplied with more power than the clearance array, consistent with two frequency localizer guidance systems and the current airborne receiver equipment used with these systems, even though the course and the clearance transmitters may be supplying substantially equal amounts of power to the directional coupler.

A suitable antenna array for use in the present invention may, for example, consist of fourteen aperiodic directional traveling wave antenna elements. Each antenna element is an end fire antenna consisting of an open balanced transmission line across which are connected small essentially horizontal hoop-like radiators. One end of the open balanced transmission line is fed and the opposite end is terminated into its characteristic impedance. A general description of this type antenna element is set forth in my U.S. Pat. No. 2,910,694, dated Oct. 17, 1959 which re-issued as Re-issue Pat. Re 25,035, dated Sept. 12, 1961 and is entitled "Aperiodic and Directive Antenna." The coupling between two such elements of this type is very low and the properties of an array of such elements enables the elements to be placed relatively close together and close to the end of a runway. Furthermore, the radiation pattern from an array of such elements remains essentially constant over the entire localizer frequency band (108-112 MHz). Other types of antenna elements could be used also. The above described aperiodic element is, however, well suited for use in the present invention.

It is one object of the present invention to provide a two frequency localizer system which would be suitable for use at sites where two array systems cannot be installed.

It is another object of this invention to provide radiating means for a two frequency localizer system which is easier and less expensive to install and yet which provides the advantages of systems using two arrays.

It is another object of the present invention to provide a two frequency localizer system requiring only a single antenna site and lone location for both the course and clearance transmitter systems.

It is another object of the present invention to provide a two frequency localizer system using transmitters for course and clearance frequencies which have substantially the same power ratings so that only one additional transmitter is necessary as a standby.

It is another object of the present invention to provide a single antenna array for radiating both the course and clearance beams in a two frequency localizer system.

These and other objects and features of the present invention are described herein in connection with the drawings which represent the best known present use of the invention.

DESCRIPTION OF THE DRAWINGS

FIG. 2 is a block diagram showing the principal networks of the Course or the Clearance power generators in the system;

FIG. 3 shows a detailed structure of the clearance frequency power distribution network, for feeding clearance frequency power along six transmission lines to the combining network shown in FIG. 7 in proper relative magnitude and sideband phase;

FIG. 6 shows the inputs and outputs of a typical hybrid network used in both the course and clearance frequency distribution networks shown in FIGS. 3 and 4;

DESCRIPTION OF EMBODIMENTS OF THE INVENTION

Figure 1:
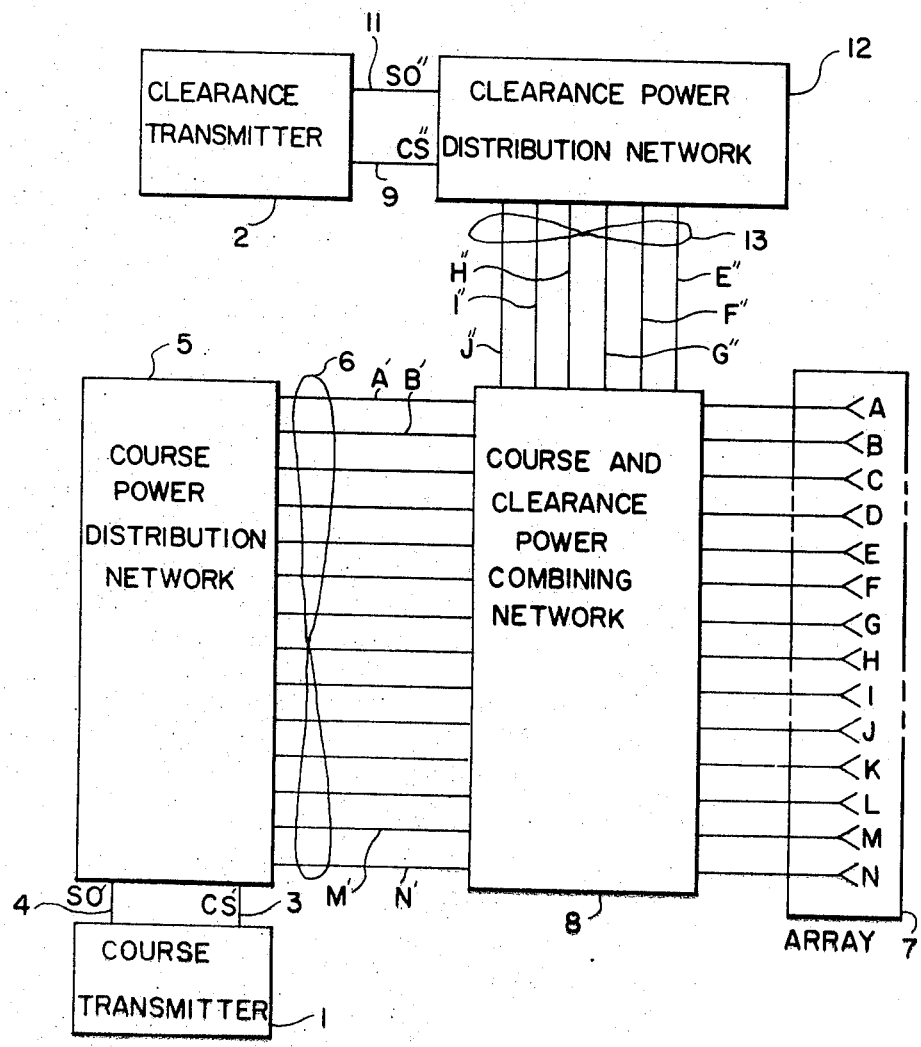
FIG. 1 is a block diagram showing the principal networks in the two frequency localizer system of the present invention, using a single fourteen element array of aperiodic directive elements.
Figure 7:
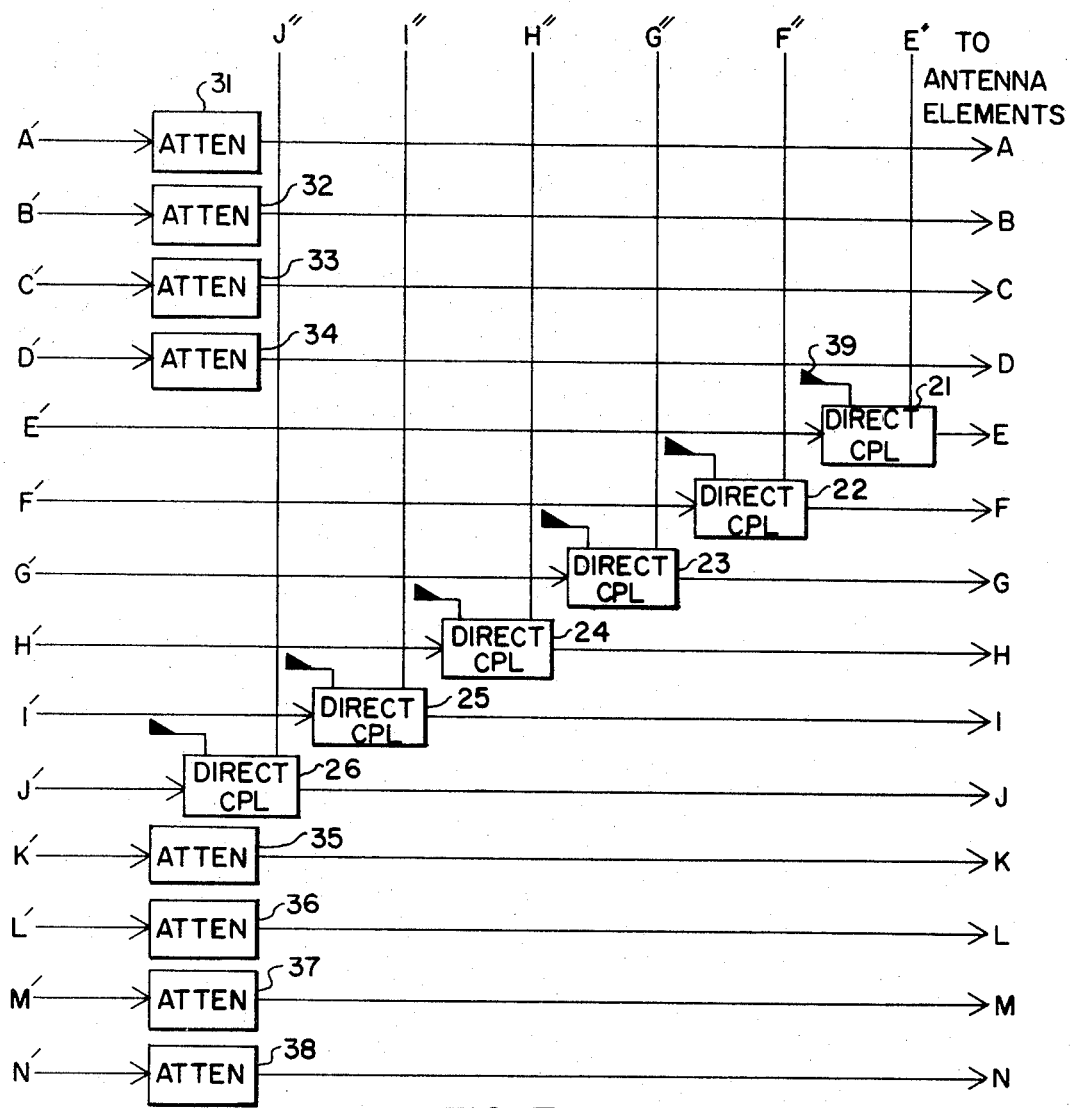
FIG. 7 illustrates the structure of the combining network into which is fed the course frequency signals on fourteen separate lines and the clearance frequency signals on six separate lines for energizing the fourteen element localizer antenna array.

The principal networks of the two frequency localizer system incorporating features of the present invention are shown in FIG. 1. This system uses a single fourteen element antenna array. All the elements in the array are energized by course frequency distributed to the elements by the power combining network which is shown in FIG. 7. The course frequency power is fed to this network by fourteen separate transmission lines each line being associated with one of the elements of the array. Similarly, clearance frequency power is fed to the inner six elements of the array by the combining network. Clearance frequency power is fed to the combining network on six separate transmission lines, each line being associated with one of the inner six elements of the antenna array. The system shown in FIG. 1 is an example of a use of the present invention and much of the following detailed description of this system relates to this particular use. More particularly, the details of description relate to the use of a fourteen element array, all elements being energized by course frequency and the inner six elements being energized by clearance frequency.

The system is energized by two transmitters, the course frequency transmitter and the clearance frequency transmitter, denoted 1 and 2, respectively. These transmitters both produce a carrier frequency, C, plus sidebands, denoted CS, and sidebands only, denoted SO. The course and clearance carrier frequencies are within the established localizer frequency band which ranges between 108 and 112 MHz. Furthermore, the carrier frequencies for the course and the clearance radiations are preferably between 5 KHz and 15 KHz (usually 8 KHz) of each other so that both the frequency groups are simultaneously received by an aircraft receiver and neither is discriminated against by the receiver. One possible arrangement for the course or the clearance transmitter, 1 or 2 in FIG. 1, is illustrated in FIG. 2. That figure also shows the signals which make up CS and SO.

Figures 4, 5:
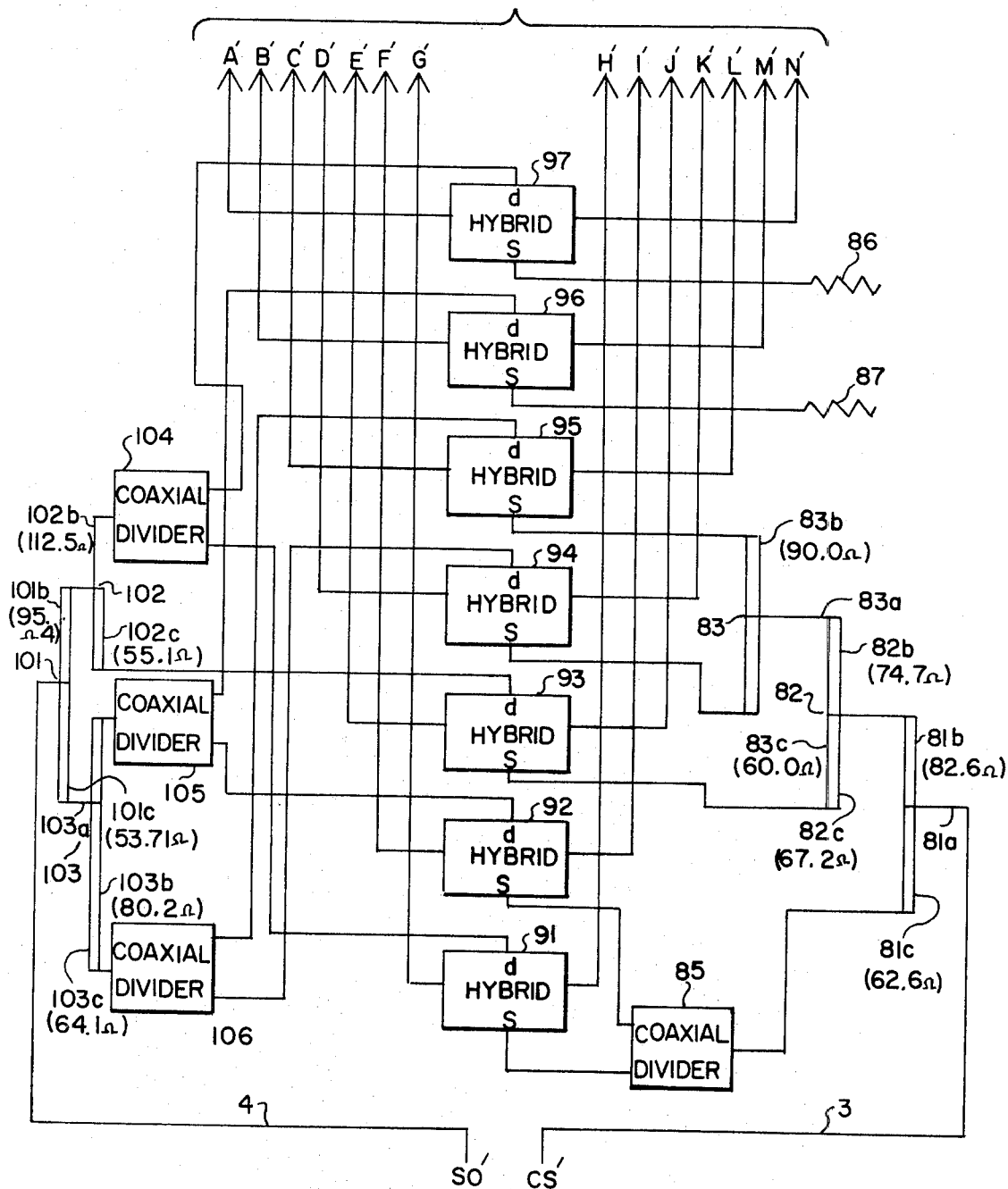
FIG. 4 shows in detail the structure of the course frequency distribution network which distributes into fourteen separate lines the course frequency power in proper relative magnitude and sideband phase.
FIG. 5 shows details of the coaxial power divider network used in the course frequency distribution network shown in FIG. 4.
Figure 8:
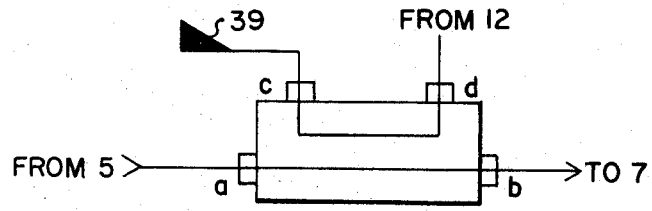
FIG. 8 illustrates one of the four port directional couplers in the combining network by which both course and clearance frequency signals are combined and fed to a selected element in the array.

The CS' and SO' signals from the course transmitter 1 are fed through separate lines 3 and 4 to the course frequency distribution network 5 which is described in considerable detail with reference to FIGS. 4 and 5. This network distributes the CS' and SO' signals, weighted as to power and sideband phase into fourteen output lines denoted 6, which feed the fourteen elements of the aperiodic element array 7 via the course and clearance power combining network 8. Details of this network are illustrated in FIGS. 7 and 8. The elements of the array may be constructed as described in my above mentioned U.S. Pat. No. 2,682,050.

The outputs of the clearance transmitter 2 denoted CS'' and SO'' through lines 9 and 11, are fed to the clearance power distribution network 12. This network distributes CS'' and SO'' weighted as to power and sideband phase into six separate transmission lines denoted generally 13. These lines feed clearance frequency power to the inner six elements of the aperiodic element array 7 via the power combining network 8. Details of construction of the clearance power distribution network are shown in FIG. 3. The fourteen elements of the array 7 are denoted A to N and the transmission lines which feed power to these elements each bear the same letter designation as the element. The transmission lines which feed course power to an element are denoted by the element letter with a prime and the transmission lines that feed clearance power to the element are denoted by the element letter with a double prime. Thus, the fourteen transmission lines from the course distribution network 5 to the combining network 8 are denoted A' to N' and the inner six transmission lines that deliver clearance power from network 12 to the combining network 8 are denoted E'' to J''.

As has been mentioned, the purpose of the distribution networks 5 and 12 is to feed CS' and SO' and CS'' and SO'' signals into the transmission lines denoted 6 and 13 that power the antenna elements, so that the proper course frequency and clearance frequency lobes are radiated by the elements. Suitable radiation patterns for the clearance frequency and the course frequency are illustrated by the plots in FIGS. 9 and 10, respectively. These plots show relative field strength as a function of azimuth degrees off the course line. In each plot, the solid line curve represents the relative field strength of the CS signal and the broken line curve represents the relative field strength of the SO signal. Thus, these plots represent the radiation patterns for the clearance and the course carrier and sideband frequencies and for the clearance and course sideband frequencies (the audio modulations which define the left and right lobe patterns).

Figure 9:
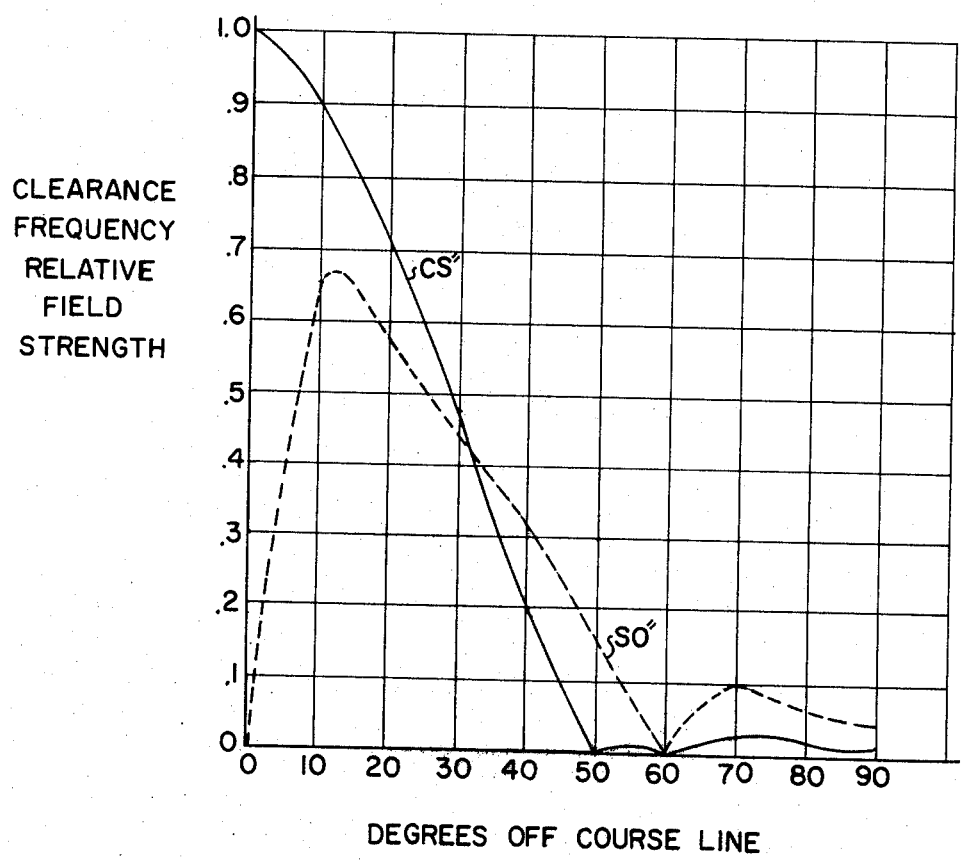
FIG. 9 shows a plot of clearance frequency radiation strength versus angular deviation from the course line.
Figure 10:
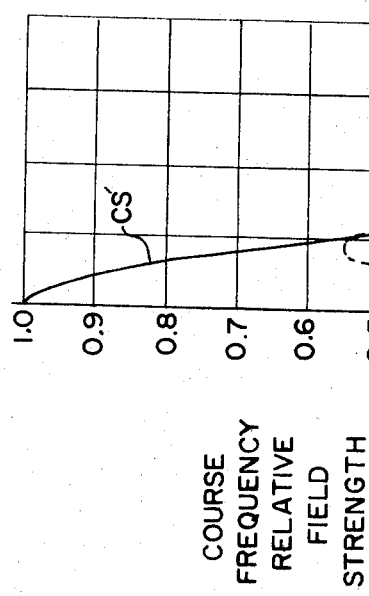
FIG. 10 shows a plot of course frequency radiation strength versus angular deviation from the course line.

The clearance and course radiation patterns shown in FIGS. 9 and 10 reveal a rather broad clearance beam for which the carrier frequency signal is most intense along the course line (0° off course) and decreases to substantially 0° at 50° off course. The course carrier frequency is also most intense in the direction of the course line; however, it decreases to 0° at about 11° off course. In practice, the intensity of the course carrier frequency signal is substantially greater than the intensity of the clearance carrier frequency. The plots shown in FIGS. 9 and 10 are each of relative field strength versus degrees off course and it will be understood that these plots are not to be compared one with the other to determine the relative power of the clearance and course frequency. The field strength of the sideband only, SO' and SO'' for the course and clearance frequencies shown by the broken line curves reveals a relatively narrow lobe pattern for SO' (the course frequency sideband lobe) and a relatively broad lobe for SO'' (the clearance frequency lobe). It should be understood that the relative phases of the 90 Hz sidebands SO' and SO'' lobe patterns to the right of the course are opposite to the phases of the same sidebands to the left of the course. Furthermore, the phases of the 150 Hz sidebands are opposite to those of the 90 Hz sidebands. The effect of this space distribution of the sidebands is that on one side of the course the 90 Hz sidebands of an SO signal adds to the corresponding sideband of CS radiation while on the same side of the course the 150 Hz sidebands in SO and CS tend to cancel each other. On the other side of the course, the 150 Hz sidebands add and the 90 Hz sidebands cancel. The result is that there are formed in space two intersecting sideband lobes one predominantly with 90 Hz sidebands, another with predominantly 150 Hz sidebands. The course is the line along which the 90 Hz sidebands are equal to the 150 Hz sidebands.

Figure 11:
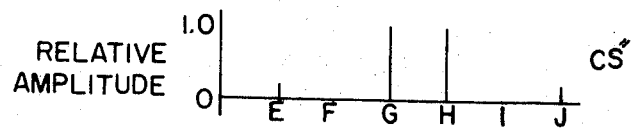
FIGS. 11 and 12 show the relative magnitudes and phases of clearance frequency power CS'' and SO'' fed to the inner six antenna elements E to J to produce the clearance frequency radiation pattern shown in FIG. 9.
Figure 12:
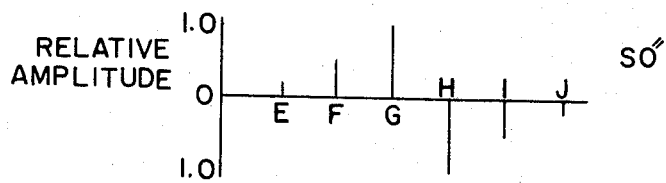

The clearance frequency CS'' and SO'' radiation patterns represented in FIG. 9 can be achieved when the inner six elements E to J of the antenna array are energized by CS'' and SO''. FIG. 11 shows by bars, denoted E to J, the relative amplitudes of CS'' currents fed to each of the antenna elements E to J. (In this case the currents fed to elements F and I are zero.) FIG. 12 shows the relative SO'' current amplitudes fed to each of the antenna elements E to J. As can be seen in FIG. 12, the phase of the sideband power fed to elements E, F and G is opposite in relative phase to the sideband power fed to elements H, I and J.

Figure 13:
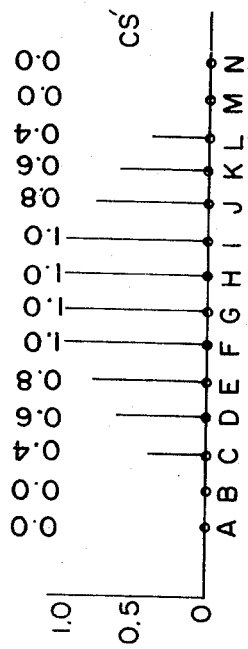
FIGS. 13 and 14 show the relative magnitudes and phases of course frequency power CS' and SO' fed to the fourteen antenna elements A to N to produce the course frequency radiation pattern shown in FIG. 10.
Figure 14:
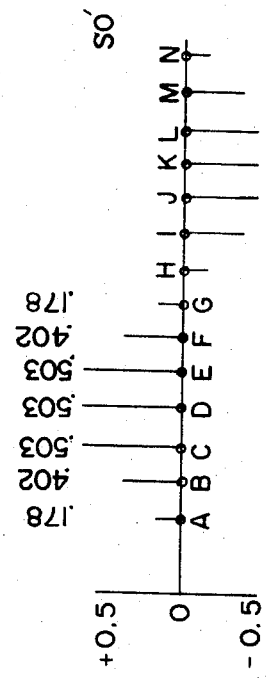

FIGS. 13 and 14 are similar representations of CS' and SO' for the course frequency radiation patterns plotted in FIG. 10. As shown in these figures, CS' is fed into antenna elements C to L and SO' is fed into all the antenna elements from A to N. This is only one of many possible distributions. In some cases all elements may be fed.

The function of the course and clearance distribution networks 5 and 12 is to feed their associated transmission lines with CS and SO power as shown in FIGS. 11 to 14. As a result, the amplitudes of the currents in transmission lines A' to N' will relate to each other as illustrated in FIGS. 13 and 14 and the currents in transmission lines E'' to H'' will relate to each other as illustrated in FIGS. 11 and 12. However, these plots do not reveal the relative power levels of course and clearance frequency signals as that will depend upon the initial power levels of the course and clearance frequency transmitters. It has been mentioned in the Background of the Present Invention that a suitable ratio of course to clearance frequency powers feeding the antenna elements is between 2:1 and 10:1 so that the radiated power along the course at the course frequency from the antenna is 2 ($\alpha'/\alpha''$) to 10 ($\alpha'/\alpha''$) times as great as the power of the clearance frequency where $\alpha'$ is the power gain on the course of the array at the course frequency and $\alpha''$ is the power gain on the course at the clearance frequency. The function of the combining network 8 is to combine the signals from the course and clearance transmission lines and feed the combined signals to the antenna elements. In this respect, it is most desireable to combine the signals so that each antenna element is fed with course and clearance powers in the desired ratio to produce not only the desired radiation pattern shapes for each frequency, but also to produce the desired relative intensities of radiation at each frequency. In addition to that, the combining network should preferably be a reflectionless network as seen from any one of its ports. A combining network which accomplishes these purposes and objects is shown in FIG. 7.

As shown in FIG. 7, the transmission lines E' to J' each feed one of the input ports of one of the directional couplers 21 to 26. This input port in each of the directional couplers is denoted a as shown by an enlarged view of one of the couplers in FIG. 8. The other input port d, of each of these directional couplers 21 to 26 receives clearance frequency power from the transmission lines E'' to J'', respectively. Thus, the course and clearance frequency powers in lines E' and E'' are combined by directional coupler 21 which feed the antenna element E.

The antenna elements A to D and K to N are fed course frequency power only, directly from transmission lines A' to D' and K' to N', respectively. Suitable non-reflective attenuators 31 to 38 in these lines are adjusted to provide the desired relative power levels for the desired antenna radiation patterns as shown and described herein with reference to FIGS. 10, 13 and 14. Such attenuators would be needed only with an existing distribution network for a course array. A new network can be designed to accomplish the same result without the loss of power which would be lost in the attenuator. This power, however, is small.

The four ports in each of the directional couplers 21 to 26 are denoted a, b, c and d. The course frequency power is coupled to the through line port a, so that it is transmitted to port b with relatively little loss. The clearance frequency power, however, is coupled to the isolated port d. The ports a and d are substantially uncoupled, for example, less than 0.3 percent of the power going into port a is coupled to port d and vice versa. There is, for all practical purposes, complete isolation of, for example, transmission line E' from transmission line E''. The fraction of clearance frequency power fed to port d that is coupled to the output port b will depend upon the coupling factor $\beta$ of the particular directional coupler. If the directional couplers are, for example, 6 db couplers then approximately 75 percent of the course frequency power fed into port a of the coupler will emerge from the output port b and approximately 25 percent of the clearance frequency power fed to port d will emerge from output port b. The rest of the course and clearance frequency power will be absorbed by the non-reflective dummy load 39 connected to port c of the directional coupler.

Clearly, if the course and clearance frequency power levels fed to input ports a and d of the directional coupler are about equal, and the coupler is a 6 db directional coupler then the output ratio of course to clearance power from the coupler will be about 3:1 and this is just about the usually desired or preferred ratio. This is particularly the preferred ratio when solid state transmitters are employed delivering 15 or 12 watts of modulated power to a 14 element course array with the inner six elements serving also as a clearance array. Expressed in another way, the clearance frequency power input to the directional coupler is down 6 db at the output port b of the coupler and the course frequency input power to the coupler is down 1.23 db at the output port of the coupler.

Where the directional couplers, as in the example described above, are all 6 db couplers and the outputs in lines A' to N' from the course distribution network 5 are all properly adjusted as to magnitude and phase with respect to each other as required to produce the desired course frequency radiation patterns, then the attenuators 31 to 38 in lines A' to D' and K' to N' should attenuate signals the same as the attenuation from ports a to b of the directional couplers. Accordingly in this example, these attenuators should attenuate about 1.23 db.

It should be understood that the directional couplers may have a coupling factor other than 6 db and so the attenuators would attenuate other than 1.23 db in keeping with the purpose of the attenuators. The relatively simple example given above uses six identical directional couplers and attenuators which attenuate the same as the primary line in the directional couplers. In a distribution network for the course array specially designed for use with the combined arrays, the distribution may be corrected for the loss in the couplers so that no attenuation in the network of FIG. 7 would be necessary. In this simple example, the transmission lines A' to N' from the network 5 carry the CS' and SO' signals for energizing the antenna elements A to N, respectively with exactly the prescribed signals weighted as to magnitude and sideband phase to produce the desired shaped antenna radiation pattern (such as the pattern shown in FIG. 10.) Likewise, in this example, the transmission lines E'' to J'' carry CS'' and SO'' weighted in magnitude and sideband phase relative to each other as required to produce a desired clearance frequency radiation pattern shape (such as the shape represented in FIG. 9.) Thus, in this example, the directional couplers and attenuators do not disturb the weighting factors for the course frequency signals in lines A' to N' and do not disturb the weighting factor for the clearance signals in lines E'' to J''. In this example, the directional couplers and attenuators provide the desired power energizing the antenna array. In addition, by virtue of the intrinsic nature of a directional coupler, reflections from the antenna elements are not transmitted back to the course and clearance distribution networks. A good match of the antenna elements is, therefore, very desireable.

The present invention also contemplates using directional couplers in the combining network 8 for coupling course and clearance frequency power to some of the elements of the array using couplers for which the coupling factor of all the couplers is not the same. In that sort of arrangement, the directional couplers would play a part as a factor within weighting factors for the course frequency signals with respect to each other as the signals are fed to the antenna elements. Also, the couplers would play a part in determining the relationship of clearance frequency signals to each other as the signals are fed to the antenna elements at the same time but in the opposite sense.

Suitable construction of a directional coupler for use as described above in the combining network 8 is illustrated in FIG. 8. The coupler includes a primary line or through line 42 between coupler ports $a$ and $b$ and a secondary line 43 between ports $c$ and $d$.

The directional coupler is a convenient device for use as described above to provide unequal distribution of course and clearance frequency power even though the course and clearance frequency transmitters are substantially equal. The same unequal distribution could also be obtained using unequal dividing hybrids in place of each of the directional couplers. A suitable unequal dividing hybrid is described in U.S. Pat. No. 3,467,919 which issued Sept. 16, 1969 to H. H. Leach, et al, and is entitled, "Apparatus For Unequal Power Division Exhibiting Hybrid Properties." The hybrid structure described in that patent includes four ports. Each of the directional couplers 21 to 26 in the combining network 8 could be replaced by an unequal hybrid such as described in that patent. For example, in replacing directional coupler 21 with such an unequal hybrid, line E' would feed port 21 in the patent, line E" would feed port 24 in the patent, non-reflective load 39 would be coupled to port 12 in the patent and port 15 in the patent would feed antenna element E. Where such unequal hybrids are used in the combining network, it is preferred that they all be substantially the same and so, they all feed course and clearance frequency power to an element of the antenna in the same ratio.

The course and clearance power distribution networks 5 and 12, as described above, are intended to each provide a balance as to magnitude and sideband phase of either the course or the clearance frequency signals in the transmission lines that feed the antenna elements. As described herein with reference to the relatively simplest construction of the combining network 8 using identical directional couplers and attenuators matched to the primary line of the directional couplers, the distribution networks each determine the weighting factors for signals in the associated transmission lines. Examples of such networks to produce the radiation patterns shown in FIGS. 9 and 10 by energizing the antenna elements as illustrated in FIGS. 11 to 14 are shown in FIGS. 3 and 4.

The clearance power distribution network 12, illustrated in FIG. 3 receives CS" and SO" power in lines 9 and 11, respectively, from clearance generator 2. The general construction of the clearance transmitter 2 as well as the course transmitter 1 is illustrated in FIG. 2. This includes a carrier frequency generator which generates course frequency in one case and clearance frequency in the other feeding a 90 Hz modulator 52 and a 150 Hz modulator 53. These modulators are driven by 90 Hz generator 54 and 150 Hz generator 55, respectively. The output of modulator 52 produces a signal denoted C, (C ± 90)+ which means carrier frequency plus the 90 Hz sideband in the plus phase. Similarly, modulator 53 poduces a signal denoted C, (C ± 150)+ which denotes carrier plus the 150 Hz modulation in the plus phase. These signals are fed to a hybrid circuit 56. The hybrid circuit produces CS in one output line 57 and SO in the other output line 58. The CS signal consists of carrier frequency plus the 90 Hz modulation in positive phase and the 150 Hz modulation in positive phase. The SO signal consists of only the two sidebands, 90 Hz in positive phase and 150 Hz in negative phase. Thus, the hybrid circuit 56 adds the two inputs to produce CS and substracts one from the other to produce SO.

Returning to FIG. 3, the CS" and the SO" signals in lines 9 and 11 are fed to power dividers 61 and 62 that splits the power in these lines as determined by the impedances of the three transformer sections which form some of these power dividers. Each power divider consists of two or three quarter wavelength transformer sections, each of predetermined impedance and connected together as shown. For example, power divider 61 is made of three one-quarter wavelength transformer sections 63, 64 and 65 for which the impedances are 19.6, 20 and 100 ohms, respectively.

Power divider 62 also has three quarter wavelength sections 66 to 68 each of which is a transformer of the impedance shown. A third power divider 69 connects to section 68 and is also comprised of three quarter wavelength transformer sections 71 to 73, each of the impedance shown. The transmission lines from the three power dividers are all transformer sections of the three power dividers. These lines couple to the inputs of three hybrid circuits 74 to 76 as shown in the figure. The lines from sections 67, 72 and 73 connect to the "difference" terminal shown as $d$ of the hybrid circuits 74, 75 and 76, respectively. The "sum" terminal of hybrid circuit 75 connects to a dummy load 77. Thus, weighted values of SO" are coupled by matched transmission lines to the $d$ terminals of the three hybrids 74 to 76 and weighted values of CS" are coupled by matched transmission lines to the $s$ terminals of hybrids 74 and 76.

The function of one of the hybrid circuits 74 to 76 or hybrid circuit 56 in the course or clearance distribution network is illustrated in FIG. 6. The SO input to the $d$ ("difference") port of the hybrid is the same signal as in line 11 weighted by, a factor $m$ as a result of the action of the power dividers. The CS input to the $s$ ("sum") port of the hybrid is the same as in line 9 weighted by the same factor $m$. That is, the carrier power is weighted by the factor $m$ and the sidebands are weighted by the factor $m$. The two outputs of the hybrid denoted, for example, G and H are the difference and sum, respectively, of the two input signals.

The course frequency distribution network 5 is similar to the clearance network 12 and is shown by block diagram in FIG. 4. The lines 3 and 4 from the course power generator 1 carrying CS' and SO', respectively, each feed a series of power dividers and the output for these power dividers are combined in a group of hybrid circuits, like the hybrid circuit shown in FIG. 6, to provide weighted carrier signals and sideband signals to the transmission lines A' to N'. As shown in FIG. 4, line 3 feeds cascaded power dividers 81, 82 and 83, each consisting of two quarter wavelength transformer sections of pre-determined impedance as shown in the figure. One section of transformer 81 feeds transformer 82 and one section of 82 feeds transformer 83. Both output sections of 83 feed the *s* inputs of two of the hybrid circuits 84. The other output of 82 feeds one of the hybrid circuits and the other output of 81 feeds a coaxial divider network 85. The two outputs of this divider network are applied to two other of the hybrid circuits 84. In this manner, weighted values of CS' are fed to the *s* terminals of the hybrid circuits 91 to 95. Fifty ohm loads 86 and 87 are connected to the *s* terminals of the hybrid circuits 96 and 97.

Weighted power of SO' are fed to the *d* terminals of these hybrid circuits by way of power divider 101, the two outputs of which feed power dividers 102 and 103. One section 102*b* of divider 102, feeds the input of coaxial divider network 104 while the other output section 102*c* feeds the *d* input of hybrid circuit 93. The output sections 103*b* and 103*c* of divider 103 feed coaxial divider networks 105 and 106. The outputs of the divider networks 104 to 106 are 50 ohm lines that feed the *d* inputs of hybrid circuits 97, 91, 96, 92, 95 and 94, respectively. Thus, weighted power of SO' are fed to the *d* terminals of each of the hybrid circuits 91 to 97.

The coaxial divider networks 85 and 104 to 106 shown in FIG. 4 are illustrated in greater detail in FIG. 5. Each of these networks consists of two T-sections and three sections of coaxial transmission line. The dimensions of the T-sections in terms of course carrier frequency wavelength are illustrated in FIG. 5. The input of the network at port 114 is connected to the center port of a 50 ohm T-section 115 which provides 50 ohm output ports 115*b* and 115*c*. A similar T-section 116 between the input and output ports connects to an open stub line 117.

In the course and clearance power distribution networks 5 and 12 which are shown in FIGS. 4 and 3, the characteristic impedances of the transformer sections of the power dividers are indicated in these figures. These characteristic impedances as well as the arrangements of the power dividers and coaxial divider networks determine the weighting of the CS and the SO signals that are fed to the sum (*s*) and difference (*d*) terminals of the hybrid circuits used in the networks. Consequently, the weighting as to power of the CS and SO signals in the transmission lines from these networks that feed the antenna elements in array 7 are determined by the characteristic impedances of the transformer sections of the power dividers. The particular arrangement and values of the characteristic impedances of these transformer sections illustrated in FIGS. 3 and 4, are capable of producing the clearance frequency and course frequency radiation patterns illustrated in FIGS. 9 and 10, respectively. More particularly, the antenna elements A to N are energized as illustrated in FIGS. 11 to 14. Furthermore, the ratio of course frequency power to clearance frequency power that is fed to the antenna elements is determined by the coupling factor B of the directional couplers 21 to 26 in the combining network 8. All of the lines, A' to N' and E'' to J'' that feed the combining network 8 are 50 ohm characteristic impedance transmission lines.

It should be noted that all of the elements of the array are fed course frequency power, only the inner six elements are fed clearance frequency power, elements A, B, M and N of the array are not supplied CS' power and elements F and I of the array are not supplied CS'' power. These conditions are shown in FIGS. 11 to 14 and are also apparent by study of FIGS. 4 and 3 with an understanding of the function of the typical hybrid circuit. It should be understood that this is an example of one use of the present invention to provide with a single antenna array both the course and clearance radiation patterns for a two frequency localizer system.

Other systems for weighting CS' and SO' and CS'' and SO'' could be substituted for the distribution networks described herein for use with the combining network described herein without deviating from the spirit and scope of the invention as set forth in the appended claims.

What is claimed is:

1. In a localizer signalling system for guiding an aircraft along a course, means producing radiation patterns of first and second different frequencies which define the course comprising, sources of first and second different frequency signals, an array of at least N radiating elements, means energized by the source of the first frequency for feeding first frequency power along N feed lines, means energized by the source of the second frequency for feeding second frequency power along n feed lines, and means coupling power from said N feed lines and said n feed lines to the N radiating elements, said coupling means including *n* means, each fed by one of said N lines and one of said n lines and each feeding unequal first and second frequency power to a different radiating element, whereby the radiation patterns of different frequencies for the localizer signalling system are radiated by the N elements.

2. A localizer signalling system as in claim 1 wherein, each of the n means is a four port directional coupler, each having two input ports and an output port which couples power to an element of the antenna array.

3. A localizer signalling system as in claim 2 wherein; the directional couplers each have isolated first and second frequency input ports and an output port to which power from said input ports is coupled unequally, one of said N lines couples to said first frequency input port, one of said *n* lines couples to said second frequency input port, and the output port couples to one of said radiating elements.

4. A localizer signalling system as in claim 2 wherein; the coupling factors of the directional couplers are 3 db or greater.

5. A localizer signalling system as in claim 2 wherein; the coupling factors of all the directional couplers are equal.

6. A localizer signalling system as in claim 5 wherein; the coupling factors of the directional couplers is 6 db.

7. A localizer signalling system as in claim 3 wherein; the fraction $f_1$ of first frequency power coupled from the first input port to the output port of the directional coupler is at least twice the fraction $f_2$ of second frequency power coupled from the second input port to the output port of the directional coupler.

8. A localizer signalling system as in claim 7 wherein; $f_1$ is about three-quarters and $f_2$ is about one-quarter.

9. A localizer signalling system as in claim 7 wherein, $f_1/f_2$ is substantially three.

10. A localizer signalling system as in claim 2 wherein;

first and second frequency power is fed to $n$ of the N radiating elements through the n directional couplers, and the remaining N-$n$ radiating elements are not fed power from the outputs of said n directional couplers.

11. A localizer signalling system as in claim 10 wherein;

attenuators are included in the means coupling power to the said N-$n$ radiating elements.

12. A localizer signalling system as in claim 11 wherein;

the coupling factors of the $n$ directional couplers are all the same, and the equal attenuators coupling power to the N-$n$ radiating elements are all equal.

13. A localizer signalling system as in claim 2 wherein;

the total power of the first frequency along the N feed lines and the total power of the second frequency along the n feed lines are about equal, whereby the coupling factors of the said $n$ directional couplers substantially determine the ratio of first frequency radiation power to second frequency radiation power that is fed to the antenna elements.

* * * * *

UNITED STATES PATENT OFFICE
CERTIFICATE OF CORRECTION

Patent No. 3,866,228  Dated February 11, 1975

Inventor(s)  Andrew Alford

It is certified that error appears in the above-identified patent and that said Letters Patent are hereby corrected as shown below:

In column 1, lines 62 and 63, delete "returning" and insert---retuning---

In column 6, line 12, delete "0°" and insert---zero---

In column 6, line 14, delete "0°" and insert---zero---

In column 7, line 34, delete "a" and insert--- $a$ ---

Please correct the claims as follows:

In Claim 1, column 12, line 33, delete "n" and insert---$n$---.

UNITED STATES PATENT OFFICE
CERTIFICATE OF CORRECTION

Patent No. 3,866,228          Dated February 11, 1975

Inventor(s) Andrew Alford

It is certified that error appears in the above-identified patent and that said Letters Patent are hereby corrected as shown below:

n line 35, delete "unequal". In line 36, after "element", insert ---and---. After line 36, insert--- each of said n means feeds a fraction f1 of first frequency power and a fraction f2 of second frequency power that is fed thereto to the radiating element that is fed thereby, f1 and f2 being substantially unequal, ----

In Claim 3, column 12, line 52, delete "$n$" and insert---n---.

In Claim 10, column 13, lines 11 and 14, delete "$n$" and insert ---n---.

In Claim 11, column 14, line 2, delete "$n$" and insert---n---.

In Claim 12, column 14, lines 5 and 7, delete "$n$" and insert ---n---.

In Claim 13, column 14, line 14, delete "$n$" and insert---n---.

Signed and Sealed this eighteenth Day of November 1975

[SEAL]

Attest:

RUTH C. MASON
*Attesting Officer*

C. MARSHALL DANN
*Commissioner of Patents and Trademarks*